(12) United States Patent
Warren et al.

(10) Patent No.: US 12,312,968 B1
(45) Date of Patent: May 27, 2025

(54) FITTING FOR AN INSTRUMENT LEAD WITH A CONNECTOR FOR A GAS TURBINE ENGINE

(71) Applicant: RTX Corporation, Farmington, CT (US)

(72) Inventors: Eli Warren, Wethersfield, CT (US); Erik D. Rice, Lebanon, CT (US)

(73) Assignee: RTX CORPORATION, Farmington, CT (US)

( * ) Notice: Subject to any disclaimer, the term of this patent is extended or adjusted under 35 U.S.C. 154(b) by 3 days.

(21) Appl. No.: 18/519,926

(22) Filed: Nov. 27, 2023

(51) Int. Cl.
*F01D 21/00* (2006.01)
*F01D 11/00* (2006.01)

(52) U.S. Cl.
CPC .......... *F01D 21/003* (2013.01); *F01D 11/003* (2013.01); *F05D 2240/55* (2013.01); *F05D 2260/31* (2013.01); *F05D 2270/80* (2013.01)

(58) Field of Classification Search
CPC .. F01D 21/003; F01D 11/003; F05D 2240/55; F05D 2240/58; F05D 2260/31; F05D 2270/80; F16J 15/00; F16L 5/02; F16L 5/027; F16L 5/028
USPC ....................................................... 277/317
See application file for complete search history.

(56) References Cited

U.S. PATENT DOCUMENTS

| | | | | |
|---|---|---|---|---|
| 2,431,154 A * | 11/1947 | Wikstrom | ............ | H02G 3/0658 285/341 |
| 3,667,783 A * | 6/1972 | Sotolongo | ............. | H02G 3/065 285/341 |
| 3,734,547 A * | 5/1973 | Kojima | .................. | F16L 19/086 411/417 |
| 4,039,198 A * | 8/1977 | Stanton | .................. | F16J 15/184 277/533 |
| 4,135,745 A * | 1/1979 | Dehar | ................. | F16L 37/0987 285/356 |
| 4,692,561 A * | 9/1987 | Nattel | .................. | H02G 15/013 174/653 |
| 4,692,562 A * | 9/1987 | Nattel | .................. | H02G 15/013 174/653 |
| 5,083,372 A * | 1/1992 | Polutnik | ............... | F22B 37/202 29/463 |
| 9,255,654 B2 * | 2/2016 | Warren | ...................... | F16L 5/02 |
| 9,431,815 B1 * | 8/2016 | Findley | ............... | H02G 3/0641 |
| 10,107,124 B2 * | 10/2018 | Rice | ......................... | F01D 25/24 |
| 11,070,041 B2 * | 7/2021 | Warren | ................... | F16J 15/184 |
| 11,162,616 B2 * | 11/2021 | Logan | ...................... | F16L 5/08 |

(Continued)

FOREIGN PATENT DOCUMENTS

EP          2340899 B1    9/2016

*Primary Examiner* — Nathan Cumar
(74) *Attorney, Agent, or Firm* — CANTOR COLBURN LLP (57) ABSTRACT

A packing sub-assembly for a fitting assembly for an instrumentation lead, including: a first component; a second component; and a third component, the first component, the second component and the third component each being configured to interlock with each other to define an opening that passes through the packing sub-assembly, and each defining a portion of the opening and having an open area adjacent to the portion that defines the opening and wherein the open area is sealed by an adjacent one of the first component, the second component and the third component when the first component, the second component and the third component are interlocked together.

20 Claims, 4 Drawing Sheets

(56) References Cited

U.S. PATENT DOCUMENTS

| | | | | |
|---|---|---|---|---|
| 2005/0227526 A1* | 10/2005 | Hopper | ............... | H02G 15/013 |
| | | | | 374/E13.006 |
| 2013/0014974 A1* | 1/2013 | Burke | ............... | G02B 6/44775 |
| | | | | 174/135 |
| 2013/0193683 A1* | 8/2013 | Seto | .................. | F16L 19/065 |
| | | | | 285/384 |
| 2014/0028020 A1* | 1/2014 | Langer | .................. | F01D 17/08 |
| | | | | 285/353 |
| 2015/0091296 A1* | 4/2015 | Landis | .................. | F16L 5/12 |
| | | | | 285/139.1 |
| 2016/0141853 A1* | 5/2016 | Findley | ............... | H02G 15/007 |
| | | | | 174/653 |
| 2017/0317478 A1* | 11/2017 | Bertini | ................ | H02G 15/013 |
| 2018/0131170 A1* | 5/2018 | Maass | ................. | H02G 15/013 |
| 2018/0233892 A1* | 8/2018 | Smith | .................. | H02G 3/06 |
| 2018/0375249 A1* | 12/2018 | Hara | ................... | H01R 13/5227 |
| 2019/0309880 A1* | 10/2019 | Costanzi | ............... | H02G 15/04 |
| 2020/0313416 A1* | 10/2020 | Warren | ................. | F01D 25/24 |
| 2021/0320487 A1* | 10/2021 | Soerensen | ........... | H02G 1/10 |
| 2021/0391700 A1* | 12/2021 | Rech | .................. | H01R 43/048 |
| 2022/0349159 A1* | 11/2022 | Cosley | ................. | F16L 3/105 |

* cited by examiner

FITTING FOR AN INSTRUMENT LEAD WITH A CONNECTOR FOR A GAS TURBINE ENGINE

TECHNICAL FIELD

This disclosure relates to a fitting for an instrument lead with a connector for a gas turbine engine.

BACKGROUND

When an instrumentation lead has a connector that must stay attached throughout assembly/routing/egress and the lead must also be sealed through any cavity walls, multiple seal pieces must be used to make a complete annulus seal (split seals). Typical sealing methods involve fittings which require very large torques to crush the seals and achieve high-pressure sealing capability. Unless completely crushed these seals can leave a straight thru leak path. While these may be acceptable regarding egressing many leads, they are quite large, especially when egressing a single lead.

In addition, the torque required for such fittings is quite high leading to additional risk to the leads. Also, using a lower torque can cause seal failure which is difficult to quantify. In some cases, the lead needs to be electrically insulated from any conductors so running multiple leads through one large fitting may create potential areas insulation failure. Accordingly, it is desirable to provide an improved seal for an electrical connector that has a connector that must stay attached throughout assembly/routing/egress.

BRIEF DESCRIPTION

Disclosed is a packing sub-assembly for a fitting assembly for an instrumentation lead, including: a first component; a second component; and a third component, the first component, the second component and the third component each being configured to interlock with each other to define an opening that passes through the packing sub-assembly, and each defining a portion of the opening and having an open area adjacent to the portion that defines the opening and wherein the open area is sealed by an adjacent one of the first component, the second component and the third component when the first component, the second component and the third component are interlocked together.

In addition to one or more of the features described above, or as an alternative to any of the foregoing embodiments, each of the first component, the second component and the third component define a portion of an exterior inclined surface of the packing sub-assembly when the first component, the second component and the third component are interlocked together.

In addition to one or more of the features described above, or as an alternative to any of the foregoing embodiments, the open area is located within an outer periphery of the packing sub-assembly defined by the exterior inclined surface.

In addition to one or more of the features described above, or as an alternative to any of the foregoing embodiments, the first component has a lower horizontal portion that extends from a vertical portion and the lower horizontal portion forms a portion of the opening and has the open area and the vertical portion forms a portion of the exterior inclined surface.

In addition to one or more of the features described above, or as an alternative to any of the foregoing embodiments, the second component has a mid-horizontal portion that extends from a vertical portion, the mid-horizontal portion being located above the lower horizontal portion when the first component and the second component are assembled together to form the packing sub-assembly and the mid-horizontal portion forms a portion of the opening and has the open area and the vertical portion of the second component forms a portion of the exterior inclined surface of the packing sub-assembly.

In addition to one or more of the features described above, or as an alternative to any of the foregoing embodiments, the third component has an upper horizontal portion that extends from a vertical portion, the upper horizontal portion being located above the mid-horizontal portion when the second component and the third component are assembled together to form the packing sub-assembly and the upper horizontal portion forms a portion of the opening and has the open area and the vertical portion of the third component forms a portion of the exterior inclined surface of the packing sub-assembly.

In addition to one or more of the features described above, or as an alternative to any of the foregoing embodiments, portions of the lower horizontal portion, the mid-horizontal portion and the upper horizontal portion extend towards opening in different directions to provide interlocking features of the packing sub-assembly.

In addition to one or more of the features described above, or as an alternative to any of the foregoing embodiments, the second component also has a portion that interfaces with the upper horizontal portion in order to form a portion of the opening.

In addition to one or more of the features described above, or as an alternative to any of the foregoing embodiments, when the first component, the second component and the third component are interlocked together pockets are provided for receipt of a potting material.

Also disclosed is a fitting assembly for a gas turbine engine, including: a cup having an inner cavity, the cup having a first opening at one end of the cup and a second opening at an opposite end of the cup, the first opening and the second opening provide access to the inner cavity: an instrumentation lead with a connector that passes through the inner cavity, the first opening and the second opening: a hollow bolt that threadingly engages the first opening via threads of the hollow bolt and threads of the inner cavity: a packing sub-assembly, including: a first component; a second component; and a third component, the first component, the second component and the third component each being configured to interlock with each other to define an opening that passes through the packing sub-assembly, and each defining a portion of the opening and having an open area adjacent to the portion that defines the opening and wherein the open area is sealed by an adjacent one of the first component, the second component and the third component when the first component, the second component and the third component are interlocked together: a ramped bushing located between the hollow bolt and the packing sub-assembly, the hollow bolt having an inner opening through which the instrumentation lead passes through and the ramped bushing has an inner opening through which the instrumentation lead passes through, the ramped busing has an inclined surface which engages an exterior inclined surface of the packing sub-assembly such that as the hollow bolt is rotated the inclined surface of the ramped busing engages the exterior inclined surface of the packing sub-assembly and the opening of the packing sub-assembly is sealed about the instrumentation lead.

In addition to one or more of the features described above, or as an alternative to any of the foregoing embodiments, a potting material is located between the instrumentation lead and the packing sub-assembly.

In addition to one or more of the features described above, or as an alternative to any of the foregoing embodiments, comprising a potting material is located between the packing sub-assembly and the cup.

In addition to one or more of the features described above, or as an alternative to any of the foregoing embodiments, each of the first component, the second component and the third component define a portion of an exterior inclined surface of the packing sub-assembly when the first component, the second component and the third component are interlocked together.

In addition to one or more of the features described above, or as an alternative to any of the foregoing embodiments, the open area is located within an outer periphery of the packing sub-assembly defined by the exterior inclined surface.

In addition to one or more of the features described above, or as an alternative to any of the foregoing embodiments, the first component has a lower horizontal portion that extends from a vertical portion and the lower horizontal portion forms a portion of the opening and has the open area and the vertical portion forms a portion of the exterior inclined surface.

In addition to one or more of the features described above, or as an alternative to any of the foregoing embodiments, the second component has a mid-horizontal portion that extends from a vertical portion, the mid-horizontal portion being located above the lower horizontal portion when the first component and the second component are assembled together to form the packing sub-assembly and the mid-horizontal portion forms a portion of the opening and has the open area and the vertical portion of the second component forms a portion of the exterior inclined surface of the packing sub-assembly.

In addition to one or more of the features described above, or as an alternative to any of the foregoing embodiments, the third component has an upper horizontal portion that extends from a vertical portion, the upper horizontal portion being located above the mid-horizontal portion when the second component and the third component are assembled together to form the packing sub-assembly and the upper horizontal portion forms a portion of the opening and has the open area and the vertical portion of the third component forms a portion of the exterior inclined surface of the packing sub-assembly.

In addition to one or more of the features described above, or as an alternative to any of the foregoing embodiments, portions of the lower horizontal portion, the mid-horizontal portion and the upper horizontal portion extend towards opening in different directions to provide interlocking features of the packing sub-assembly.

In addition to one or more of the features described above, or as an alternative to any of the foregoing embodiments, the second component also has a portion that interfaces with the upper horizontal portion in order to form a portion of the opening and wherein when the first component, the second component and the third component are interlocked together pockets are provided for receipt of a potting material.

Also disclosed is a method of sealing a fitting assembly about an instrumentation lead in a gas turbine engine, including: locating a cup in an opening in a casing of the gas turbine engine, the cup having an inner cavity, the cup having a first opening at one end of the cup and a second opening at an opposite end of the cup, the first opening and the second opening provide access to the inner cavity; passing the instrumentation lead through the inner cavity, the first opening and the second opening, the instrumentation lead having a connector; threadingly engaging a hollow bolt with the first opening via threads of the hollow bolt and threads of the inner cavity; sealing an opening of a packing sub-assembly about the instrumentation lead, the packing sub-assembly including: a first component; a second component; and a third component, the first component, the second component and the third component each being configured to interlock with each other to define the opening of the packing sub-assembly, and each defining a portion of the opening and having an open area adjacent to the portion that defines the opening and wherein the open area is sealed by an adjacent one of the first component, the second component and the third component when the first component, the second component and the third component are interlocked together; and locating a ramped bushing between the hollow bolt and the packing sub-assembly, the hollow bolt having an inner opening through which the instrumentation lead passes through and the ramped bushing has an inner opening through which the instrumentation lead passes through, the ramped busing has an inclined surface which engages an exterior inclined surface of the packing sub-assembly such that as the hollow bolt is rotated the inclined surface of the ramped busing engages the exterior inclined surface of the packing sub-assembly and the opening of the packing sub-assembly is sealed about the lead.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

As mentioned above, the ability to egress leads through ducts in jet engines is critical to many measurements in both development and production. If the impact to the asset is minimized, the whole system can be optimized, e.g., less material removal and/or added for bosses. With less impact, the designer can choose either to add more instrumentation capacity, thereby shortening development cycles or could further optimize the production parts involved thus reducing weight, cost, etc.

The present disclosure includes a multi-piece packing that is compressed by a hollow bolt. The multi-piece packing has three pieces that interlock in a way that leaves no continuous, straight leak-path through the case. The fitting performance is also less torque-dependent because it does not need to crush the seal pieces. The way the pieces interlock allows for containment of potting material without relying solely on the potting material's adhesive properties. These interlocking pieces are also very compact allowing for a very small assembly. In addition, the fitting can also be designed to better accommodate a lead that needs to be electrically insulated. Still further and in accordance with various embodiments of the present invention, the multi-piece packing is very small when compared to the lead/connector.

Figure 1:
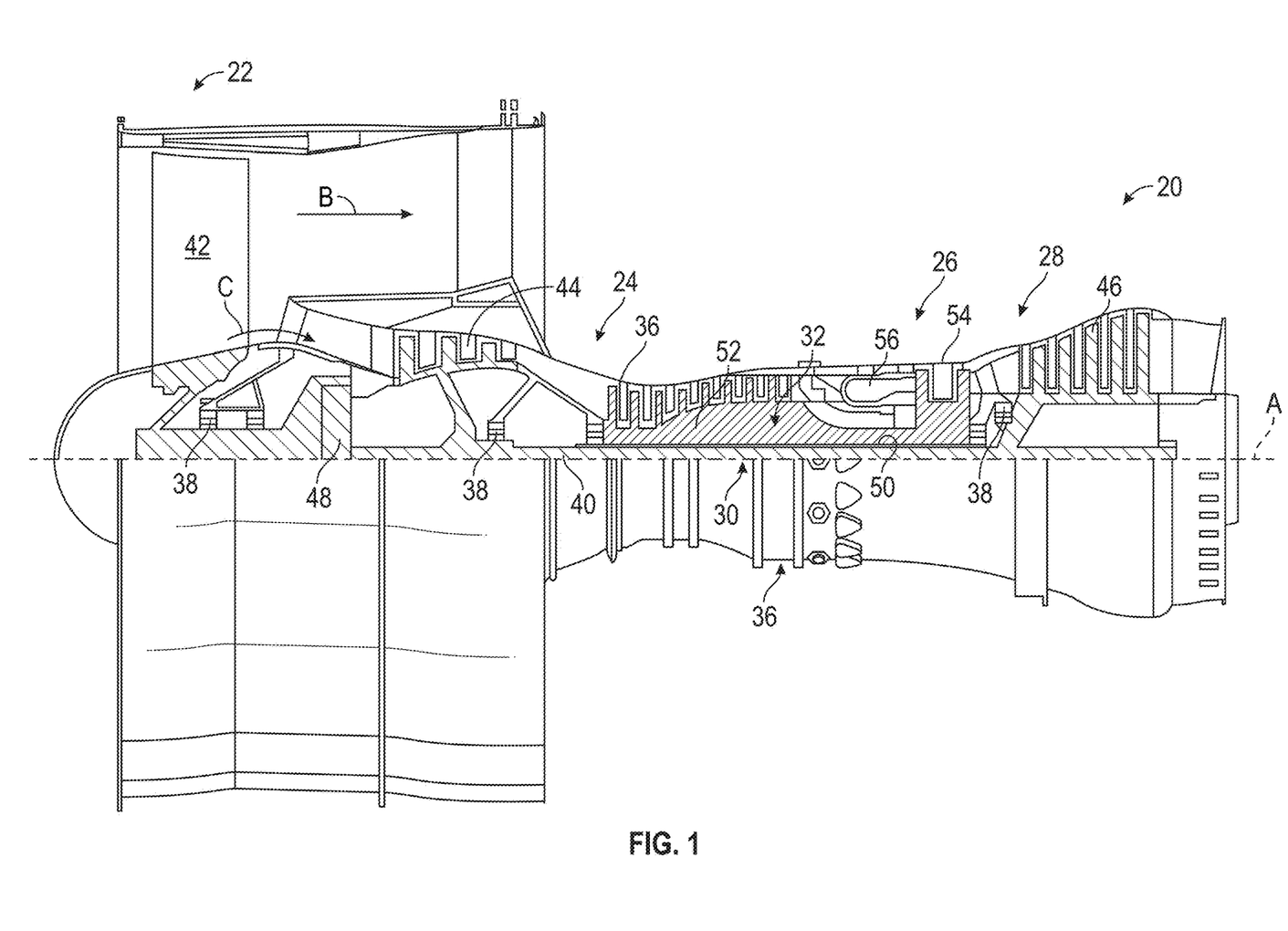
FIG. 1 is a schematic, partial cross-sectional view of a gas turbine engine in accordance with this disclosure.

Referring now to FIG. 1 a schematic illustration of a gas turbine engine 20 is provided. The gas turbine engine 20 may be one of many types of engines the fitting of the present disclosure may be used with.

Illustrated in FIG. 1 is a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure or casing 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame of the engine static structure 36 is arranged generally between the high pressure turbine 54 and the low pressure turbine 46. The mid-turbine frame further supports bearing systems 38 in the turbine section 28. The inner shaft 40 and the outer shaft 50 are concentric and rotate via bearing systems 38 about the engine central longitudinal axis A which is collinear with their longitudinal axes. The casing or engine static structure 36 forms a portion of the core case path C.

Figure 2:
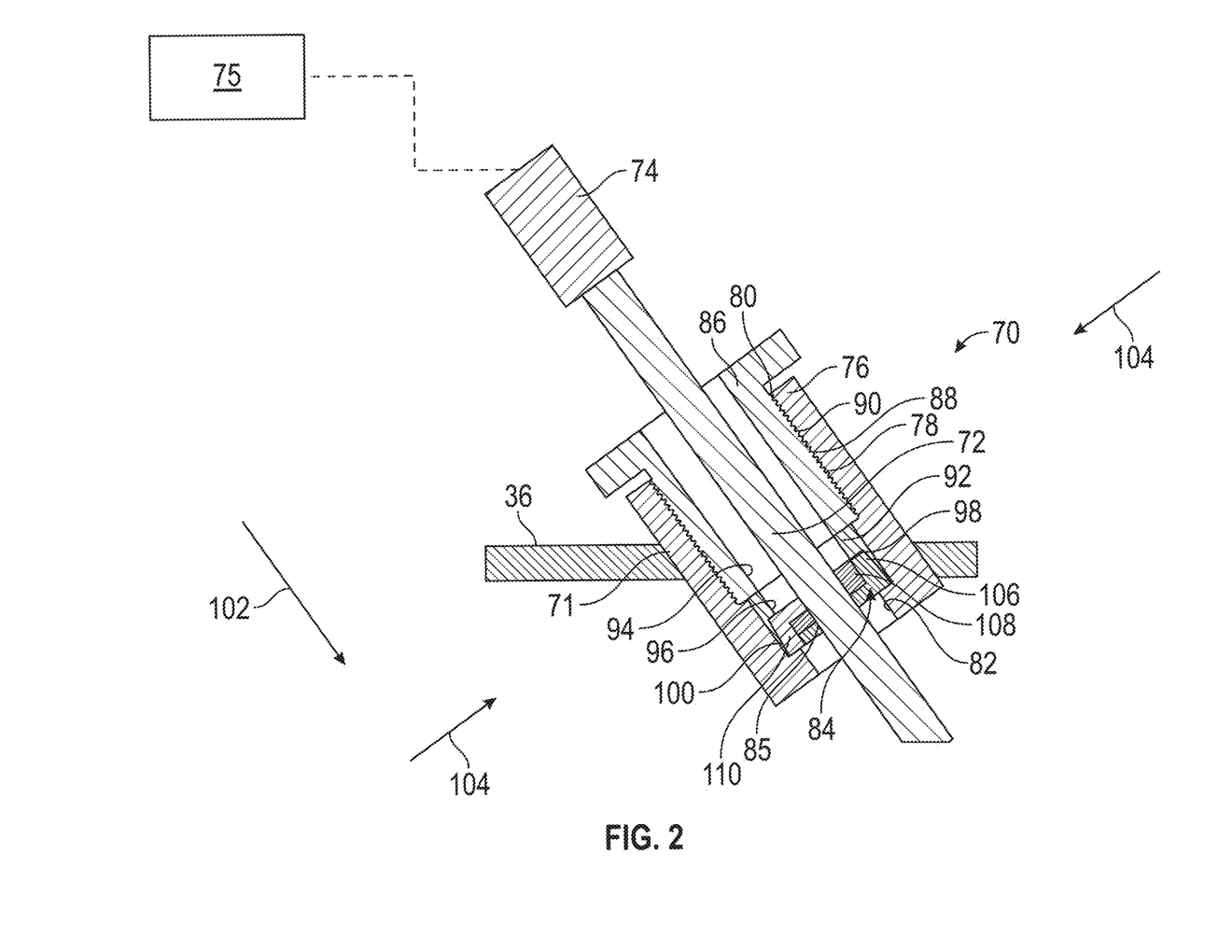
FIG. 2 a cross-sectional view of an egress fitting for an instrumentation lead with a connector in accordance with the present disclosure.

Referring now to FIG. 2, a cross-sectional view of an egress fitting assembly or fitting assembly or fitting 70 for an instrumentation lead or lead 72 with a connector 74 in accordance with the present disclosure is illustrated. The connector 74 providing a means for connecting the lead 72 to another lead and ultimately to a signal processor 75 (illustrated schematically) such that signals from a sensor or probe can be transmitted via lead 72 to the signal processor 75. Alternatively, the connector 74 is directly connected to the signal processor 75. As illustrated, the connector 74 has a larger outer periphery than the lead 72. In addition, it is desirable to have the connector 74 fixed to the lead 72 prior to it being secured or installed in the casing 36. In other words, the lead 72 with its connector 74 and its associated sensor or probe are assembled as an integral or signal unitary component before it is secured to the egress fitting assembly or fitting assembly or fitting 70 thus and in view of the larger size of the connector 74 with respect to the lead 72 there is a need for providing an apparatus and method for sealing the passage through which the connector 74 and lead 72 passes through.

The lead 72 may be operably coupled to a sensor or probe (not shown) at an opposite end with respect to connector 74. The sensor or probe being configured to provide signals indicative of any suitable parameter capable of being measured via the sensor or probe (e.g., temperature, pressure, clearance, distance, etc.) as is known in the related arts. The egress fitting assembly 70 includes a cup 76 that may be pressed or threaded in or riveted into an opening 71 in the casing 36. The cup 76 in combination with other components of the present disclosure provides a sealable passage through the casing 36 through which the lead 72 with its associated connector 74 passes before the passage is sealed. As illustrated, the cup 76 has an inner cavity 78 through which the lead 72 passes. The cup 76 has a first opening 80 at one end of the cup 76 and a second opening 82 at an opposite end of the cup 76 the first opening 80 and the second opening 82 provide access to the inner cavity 78.

As illustrated in FIG. 2, the cup 76 and the egress fitting assembly 70 may be angularly orientated with respect to the casing or engine static structure 36. Of course, other orientations of the cup 76 and the egress fitting assembly 70 with respect to the casing or engine static structure 36 may be within the scope of the present disclosure.

The egress fitting assembly 70 also includes a packing sub-assembly 84 which, as will be discussed herein, provides a seal between the lead 72 and the second opening 82. The packing sub-assembly 84 defines an opening 85 through which the lead 72 passes. The egress fitting assembly 70 also includes a hollow bolt 86 that threadingly engages the first opening 80 via threads 88 of the hollow bolt and threads 90 of the inner cavity 78.

A ramped bushing 92 is also located between the hollow bolt 86 and the packing sub assembly 84. The hollow bolt 86 has an inner opening 94 through which the lead 72 passes through and the ramped bushing 92 has an inner opening 96 through which the lead 72 passes through.

The ramped busing 92 has an inclined surface 98 which engages an exterior inclined surface 100 of the packing sub-assembly 84. As such, and as the hollow bolt 86 is rotated into the inner cavity 78 of the cup 76 in the direction of arrow 102 components of the packing sub-assembly 84 are moved in the direction of arrows 104 due to the engagement of inclined surface 98 with exterior inclined surface 100.

Figure 3A:
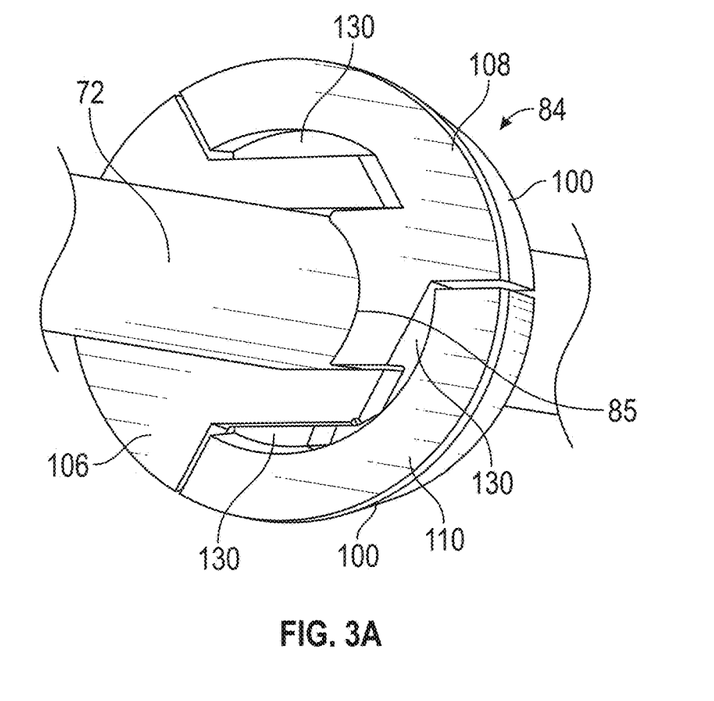
FIG. 3A is a perspective view of a packing sub-assembly in accordance with the present disclosure.
Figure 3B:
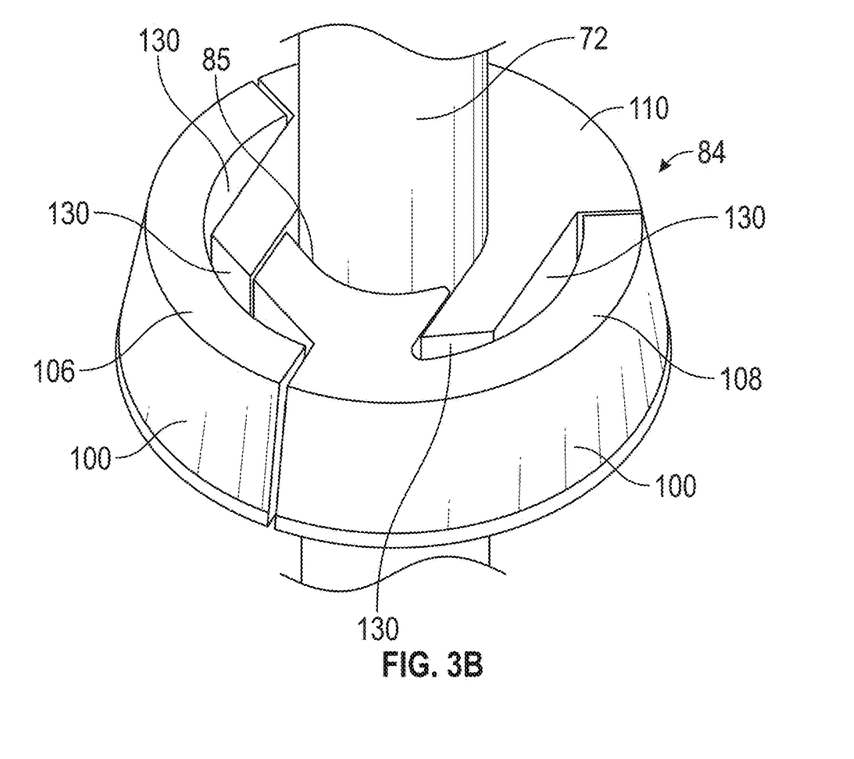
FIG. 3B is a perspective view of a packing sub-assembly in accordance with the present disclosure.
Figure 4:
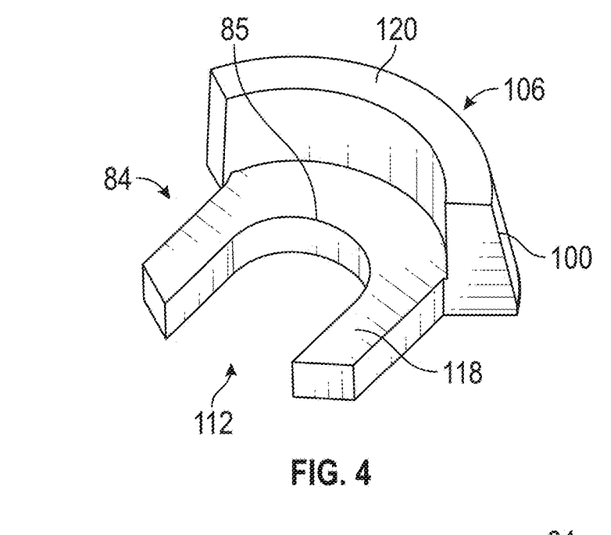
FIG. 4 is a perspective view of a portion of the packing sub-assembly illustrated in FIGS. 2-3B.
Figure 5:
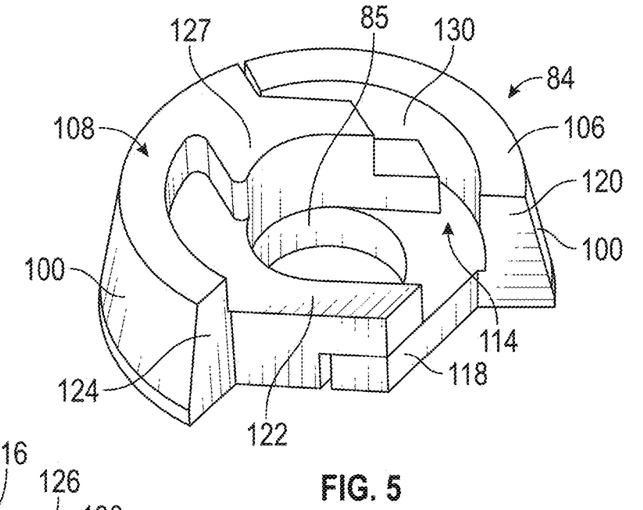
FIG. 5 is a perspective view of two portions of the packing sub-assembly illustrated in FIGS. 2-3B.
Figure 6:
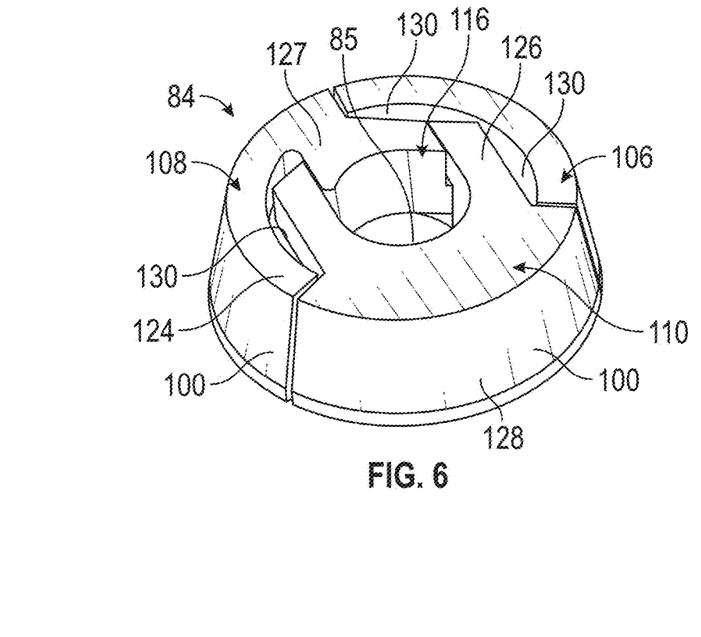
FIG. 6 is a perspective view of the packing sub-assembly in accordance with the present disclosure.

FIGS. 3A, 3B and 6, are perspective views of the packing sub-assembly 84 and FIGS. 4 and 5 illustrate components of the packing sub-assembly 84. As illustrated, the packing sub-assembly 84 has at least three components: a first component 106, a second component 108, and a third component 110. Each of the components 106, 108 and 110 when assembled form a portion of opening 85. In addition, each of the components 106, 108 and 110 form a portion of the exterior inclined surface 100. Although three interlocking components are illustrated it is understood that other alternative embodiments contemplate more than three interlocking components.

Referring now to FIGS. 4-6, each of the components 106, 108 and 110 form a portion of opening 85 and has an open area or straight through gap 112, 114 and 116 respectively. The open area or straight through gap 112, 114 and 116 is located within an outer periphery of the packing sub-assembly 84 defined by the exterior inclined surface 100. In other words, each of the three components 106, 108 and 110 has a straight through gap 112, 114 and 116 that is closed off by one of the other components 106, 108 and 110.

The first component 106 has a lower horizontal portion 118 that extends from a vertical portion 120. The lower horizontal portion 118 forms a portion of opening 85 and has the open area 112. The vertical portion 120 forms a portion of the exterior inclined surface 100 of the packing sub-assembly 84.

The second component 108 has a mid-horizontal portion 122 that extends from a vertical portion 124. The mid-horizontal portion 122 being located above the lower horizontal portion 118 when the first component 106 and the second component 108 are assembled together to form the packing sub-assembly 84. The mid-horizontal portion 122 forms a portion of opening 85 and has the open area 114. The vertical portion 124 forms a portion of the exterior inclined surface 100 of the packing sub-assembly 84.

The third component 110 has an upper horizontal portion 126 that extends from a vertical portion 128. The upper horizontal portion 126 being located above the mid-horizontal portion 122 when the second component 108 and the third component 110 are assembled together to form the packing sub-assembly 84. The upper horizontal portion 126 forms a portion of opening 85 and has the open area 116. The vertical portion 128 forms a portion of the exterior inclined surface 100 of the packing sub-assembly 84.

The lower horizontal portion 118, the mid-horizontal portion 122 and the upper horizontal portion 126 are each configured to interlock with each other to form the packing sub-assembly 84 as well as opening 85 and the exterior inclined surface 100. In addition, portions of the lower horizontal portion 118, the mid-horizontal portion 122 and the upper horizontal portion 126 extend towards opening 85 in different directions to provide the interlocking features of the packing sub-assembly 84.

Also illustrated is that the second component 108 also has a portion 127 that interfaces with the upper horizontal portion 126 in order to form a portion of opening 85.

In addition, and as each of the each of the three components 106, 108 and 110 are assembled together there will be some pockets 130 that are filled with a potting material in order complete the sealing of opening 85 about the lead 72. In addition, the potting material will also be provided between the exterior inclined surface 100 of the packing sub-assembly 84 and the inner cavity 78 in order to complete the seal between the second opening 82 and the packing sub-assembly 84. The potting material can also be provided between a bottom surface of the packing sub-assembly 84 and the area of the inner cavity 78 proximate to the second opening 82.

During assembly of the egress fitting assembly 70, the lead 72 with the connector 74 is passed through the second opening 82 of the cup 76. This may occur before or after the cup 76 is secured to the opening 71 in the casing 36. Thereafter, the components 106, 108 and 110 of the packing sub-assembly 84 are inserted into the inner cavity 78 with potting located between the components 106, 108 and 110 of the packing sub-assembly 84. In one non-limiting embodiment, the potting material may be an epoxy, silicone, polyurethane, polysulfide, UV cured and other curable sealant. In one embodiment, the potting material may be electrically conductive or alternatively electrically insulative.

Thereafter, the ramped busing 92 is inserted into the inner cavity 78 and the inclined surface 98 engages the exterior inclined surface 100 of the packing sub-assembly 84. Then, the hollow bolt 86 threadingly engages the first opening 80 via threads 88 of the hollow bolt 86 and threads 90 of the inner cavity 78. As such, and as the hollow bolt 86 is rotated into the inner cavity 78 of the cup 76 in the direction of arrow 102, components of the packing sub-assembly 84 are moved in the direction of arrows 104 due to the engagement of inclined surface 98 with inclined surface 100. The potting material located between the components 106, 108 and 110 will provide a seal between lead 72 and opening 85 of the packing sub-assembly 84. In addition, the potting material will be received within cavities formed between various portions of the components 106, 108 and 110 so a seal can be formed. However, the potting material is not the whole seal as components 106, 108 and 110 provide the majority of the sealing surfaces between the lead 72 and the second opening 82 of the cup 76. The potting material will also be located between the packing sub-assembly 84 and the inner cavity 78 so as to form a seal between opening 82 and the lead 72.

In one embodiment, the components 106, 108 and 110 as well as the cup 76, hollow bolt 86 and ramped busing 92 may be formed from a metal such as stainless steel, nickel, nickel alloys, titanium or any other suitable material. In an alternative embodiment and where there is a requirement for lead 72 to be insulated, the components 106, 108 and 110 may be formed from a non-conductive material such as a non-conductive ceramic material or any suitable non-conductive material. In addition and in this embodiment, the associated potting material may also be formed from a non-conductive material. In one non-limiting embodiment, the complex geometry of components 106, 108 and 110 may be formed via electrical discharge machining.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A packing sub-assembly for a fitting assembly for an instrumentation lead, comprising:
   a first component;
   a second component; and
   a third component,
   the first component, the second component and the third component
      each being configured to interlock with each other to define an opening that passes through the packing sub-assembly, and
      each defining a portion of the opening and having an open area adjacent to the portion that defines the opening and
   wherein the open area is sealed by an adjacent one of the first component, the second component and the third component when the first component, the second component and the third component are interlocked together.

2. The packing sub-assembly as in claim 1, wherein each of the first component, the second component and the third component define a portion of an exterior inclined surface of the packing sub-assembly when the first component, the second component and the third component are interlocked together.

3. The packing sub-assembly as in claim 2, wherein the open area is located within an outer periphery of the packing sub-assembly defined by the exterior inclined surface.

4. The packing sub-assembly as in claim 3, wherein the first component has a lower horizontal portion that extends from a vertical portion and the lower horizontal portion forms a portion of the opening and has the open area and the vertical portion forms a portion of the exterior inclined surface.

5. The packing sub-assembly as in claim 4, wherein the second component has a mid-horizontal portion that extends from a vertical portion, the mid-horizontal portion being located above the lower horizontal portion when the first component and the second component are assembled together to form the packing sub-assembly and the mid-horizontal portion forms a portion of the opening and has the open area and the vertical portion of the second component forms a portion of the exterior inclined surface of the packing sub-assembly.

6. The packing sub-assembly as in claim 5, wherein the third component has an upper horizontal portion that extends from a vertical portion, the upper horizontal portion being located above the mid-horizontal portion when the second component and the third component are assembled together to form the packing sub-assembly and the upper horizontal portion forms a portion of the opening and has the open area and the vertical portion of the third component forms a portion of the exterior inclined surface of the packing sub-assembly.

7. The packing sub-assembly as in claim 6, wherein portions of the lower horizontal portion, the mid-horizontal portion and the upper horizontal portion extend towards opening in different directions to provide interlocking features of the packing sub-assembly.

8. The packing sub-assembly as in claim 7, wherein the second component also has a portion that interfaces with the upper horizontal portion in order to form a portion of the opening.

9. The packing sub-assembly as in claim 8, wherein when the first component, the second component and the third component are interlocked together pockets are provided for receipt of a potting material.

10. A fitting assembly for a gas turbine engine, comprising:
    a cup having an inner cavity, the cup having a first opening at one end of the cup and a second opening at an opposite end of the cup, the first opening and the second opening provide access to the inner cavity;
    an instrumentation lead with a connector that passes through the inner cavity, the first opening and the second opening;
    a hollow bolt that threadingly engages the first opening via threads of the hollow bolt and threads of the inner cavity;
    a packing sub-assembly, comprising:
       a first component;
       a second component; and
       a third component,
       the first component, the second component and the third component
          each being configured to interlock with each other to define an opening that passes through the packing sub-assembly, and
          each defining a portion of the opening and having an open area adjacent to the portion that defines the opening and
       wherein the open area is sealed by an adjacent one of the first component, the second component and the third component when the first component, the second component and the third component are interlocked together; and
    a ramped bushing located between the hollow bolt and the packing sub-assembly, the hollow bolt having an inner opening through which the instrumentation lead passes through and the ramped bushing has an inner opening through which the instrumentation lead passes through, the ramped busing has an inclined surface which engages an exterior inclined surface of the packing sub-assembly such that as the hollow bolt is rotated the inclined surface of the ramped busing engages the exterior inclined surface of the packing sub-assembly and the opening of the packing sub-assembly is sealed about the instrumentation lead.

11. The fitting assembly as in claim 10, further comprising a potting material located between the instrumentation lead and the packing sub-assembly.

12. The fitting assembly as in claim 10, further comprising a potting material located between the packing sub-assembly and the cup.

13. The fitting assembly as in claim 10, wherein each of the first component, the second component and the third component define a portion of an exterior inclined surface of the packing sub-assembly when the first component, the second component and the third component are interlocked together.

14. The fitting assembly as in claim 13, wherein the open area is located within an outer periphery of the packing sub-assembly defined by the exterior inclined surface.

15. The fitting assembly as in claim 14, wherein the first component has a lower horizontal portion that extends from a vertical portion and the lower horizontal portion forms a portion of the opening and has the open area and the vertical portion forms a portion of the exterior inclined surface.

16. The fitting assembly as in claim 15, wherein the second component has a mid-horizontal portion that extends from a vertical portion, the mid-horizontal portion being located above the lower horizontal portion when the first component and the second component are assembled together to form the packing sub-assembly and the mid-horizontal portion forms a portion of the opening and has the open area and the vertical portion of the second component forms a portion of the exterior inclined surface of the packing sub-assembly.

17. The fitting assembly as in claim 16, wherein the third component has an upper horizontal portion that extends from a vertical portion, the upper horizontal portion being located above the mid-horizontal portion when the second component and the third component are assembled together to form the packing sub-assembly and the upper horizontal portion forms a portion of the opening and has the open area and the vertical portion of the third component forms a portion of the exterior inclined surface of the packing sub-assembly.

18. The fitting assembly as in claim 17, wherein portions of the lower horizontal portion, the mid-horizontal portion and the upper horizontal portion extend towards opening in different directions to provide interlocking features of the packing sub-assembly.

19. The fitting assembly as in claim 18, wherein the second component also has a portion that interfaces with the upper horizontal portion in order to form a portion of the opening and wherein when the first component, the second component and the third component are interlocked together pockets are provided for receipt of a potting material.

20. A method of sealing a fitting assembly about an instrumentation lead in a gas turbine engine, comprising:
    locating a cup in an opening in a casing of the gas turbine engine, the cup having an inner cavity, the cup having a first opening at one end of the cup and a second opening at an opposite end of the cup, the first opening and the second opening provide access to the inner cavity;
    passing the instrumentation lead through the inner cavity, the first opening and the second opening, the instrumentation lead having a connector;
    threadingly engaging a hollow bolt with the first opening via threads of the hollow bolt and threads of the inner cavity;
    sealing an opening of a packing sub-assembly about the instrumentation lead, the packing sub-assembly comprising:
        a first component;
        a second component; and
        a third component,
        the first component, the second component and the third component
            each being configured to interlock with each other to define the opening of the packing sub-assembly, and
            each defining a portion of the opening and having an open area adjacent to the portion that defines the opening and
        wherein the open area is sealed by an adjacent one of the first component, the second component and the third component when the first component, the second component and the third component are interlocked together; and
    locating a ramped bushing between the hollow bolt and the packing sub-assembly, the hollow bolt having an inner opening through which the instrumentation lead passes through and the ramped bushing has an inner opening through which the instrumentation lead passes through, the ramped busing has an inclined surface which engages an exterior inclined surface of the packing sub-assembly such that as the hollow bolt is rotated the inclined surface of the ramped busing engages the exterior inclined surface of the packing sub-assembly and the opening of the packing sub-assembly is sealed about the lead.

\* \* \* \* \*